United States Patent
Onda et al.

(10) Patent No.: US 10,120,119 B2
(45) Date of Patent: Nov. 6, 2018

(54) PLANAR ILLUMINATION APPARATUS WITH SCATTERING UNIT BY RAYLEIGH SCATTERING

(71) Applicant: MINEBEA MITSUMI INC., Kitasaku, Nagano (JP)

(72) Inventors: Kaoru Onda, Fukuroi (JP); Kenta Takakusaki, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 33 days.

(21) Appl. No.: 15/386,543

(22) Filed: Dec. 21, 2016

(65) Prior Publication Data

US 2017/0184778 A1 Jun. 29, 2017

(30) Foreign Application Priority Data

Dec. 24, 2015 (JP) .................................. 2015-251696
Dec. 9, 2016 (JP) .................................. 2016-239313

(51) Int. Cl.
   *F21V 8/00* (2006.01)
(52) U.S. Cl.
   CPC ........... *G02B 6/0061* (2013.01); *G02B 6/002* (2013.01); *G02B 6/0043* (2013.01); *G02B 6/0073* (2013.01); *G02B 6/0065* (2013.01)
(58) Field of Classification Search
   CPC .. G02B 6/0043; G02B 6/0081; G02B 6/0061; G02B 6/0073; G02B 6/003;

(Continued)

(56) References Cited

U.S. PATENT DOCUMENTS 8,622,560 B2 * 1/2014 Di Trapani ............ G02B 6/001
                                                        362/2
8,718,437 B2 * 5/2014 Coe-Sullivan .......... G09F 13/22
                                                        385/129

(Continued)

FOREIGN PATENT DOCUMENTS

JP       2003-207646 A    7/2003
JP       2005-347010 A    12/2005

(Continued)

OTHER PUBLICATIONS

Notification of Reasons for Refusal for corresponding Japanese Application No. 2016-239313 dated Oct. 30, 2017 and English translation.
Notification of Reasons for Refusal for corresponding Japanese Application No. 2016-239313 dated Mar. 23, 2018 and English translation.

*Primary Examiner* — Robert J May
(74) *Attorney, Agent, or Firm* — Pearne & Gordon LLP (57) ABSTRACT

A planar illumination apparatus according to an embodiment includes a light source and a light guide plate. The light source includes a light emitting diode and a wavelength conversion material that is excited by light emitted from the light emitting diode so as to emit light, and emits white light. The light guide plate includes an incident end surface on which the light source is disposed, and an emission surface that emits light incident from the incident end surface. The light guide plate is provided with a light scattering unit on at least one of the emission surface and a rear surface opposed to the emission surface. The light scattering unit mainly scatters light emitted from the light emitting diode than light emitted from the wavelength conversion material.

13 Claims, 5 Drawing Sheets

(58) Field of Classification Search
CPC .. G02B 6/0031; G02B 6/0033; G02B 6/0035; G02B 6/0036; G02B 6/0038; G02B 6/004; G02B 6/0041; G02B 6/0045; G02B 6/0046; G02B 6/0048; F21Y 2115/10

See application file for complete search history.

(56) References Cited

U.S. PATENT DOCUMENTS

| | | | |
|---|---|---|---|
| 9,169,995 B2 * | 10/2015 | Miglio | ............... B32B 27/00 |
| 9,618,792 B2 * | 4/2017 | Oh | ............... G02F 1/133609 |
| 2004/0141108 A1 | 7/2004 | Tanaka et al. | |
| 2010/0103699 A1 | 4/2010 | Gonda et al. | |
| 2012/0002437 A1 * | 1/2012 | Yabe | ............... G02B 6/0028 |
| | | | 362/606 |
| 2015/0378083 A1 * | 12/2015 | Takakusaki | ......... G02B 6/0043 |
| | | | 362/607 |

FOREIGN PATENT DOCUMENTS

| | | |
|---|---|---|
| JP | 2008-130279 A | 6/2008 |
| JP | 2008-235264 A | 10/2008 |
| JP | 2010-103068 A | 5/2010 |
| JP | 2012-094283 A | 5/2012 |
| JP | 2013-114876 A | 6/2013 |
| JP | 2014-149967 A | 8/2014 |

\* cited by examiner

PLANAR ILLUMINATION APPARATUS WITH SCATTERING UNIT BY RAYLEIGH SCATTERING

CROSS-REFERENCE TO RELATED APPLICATIONS

The present application claims priority to and incorporates by reference the entire contents of Japanese Patent Application No. 2015-251696 filed in Japan on Dec. 24, 2015; and Japanese Patent Application No. 2016-239313 filed in Japan on Dec. 9, 2016.

BACKGROUND OF THE INVENTION

1. Field of the Invention

The present invention relates to a planar illumination apparatus.

2. Description of the Related Art

A side-light type planar illumination apparatus (backlight) formed by disposing a light source emitting white light along a side end surface of a light guide plate has been widely used as an illumination means for a crystal display panel. Such a planar illumination apparatus is required to achieve thinning, high luminance, uniformity of luminance, and the like, and is increasingly required to improve uniformity of a color tone of emitting light.

However, recently, further reducing color unevenness that is generated on a side opposite to a light source side of a light guide plate becomes an issue along with high resolution of a crystal display panel and thinning/enlargement of the light guide plate. In addition, the planar illumination apparatus is required to partially or locally adjust a color tone on a light guide plate.

SUMMARY OF THE INVENTION

A planar illumination apparatus according to one embodiment of the present invention includes a light source and a light guide plate. The light source includes a light emitting diode and a wavelength conversion material that is excited by light emitted from the light emitting diode so as to emit light, and emits white light. The light guide plate includes an incident end surface on which the light source is disposed, and an emission surface that emits light incident from the incident end surface. The light guide plate is provided with a light scattering unit on at least one of the emission surface and a rear surface opposed to the emission surface. The light scattering unit mainly scatters light emitted from the light emitting diode than light emitted from the wavelength conversion material.

DETAILED DESCRIPTION OF THE PREFERRED EMBODIMENT

A planar illumination apparatus 10 according to an embodiment of the present invention will now be described with reference to the accompanying drawings. In each of the drawings, a shape, a size, and the like of each component are exaggeratingly illustrated as appropriate to facilitate understanding of the present invention. In each of the accompanying drawings, when two components are illustrated so that they are adjacent to each other through a space, the space is inserted or is exaggeratingly illustrated to assist understanding of the present invention, and the configuration of the present invention is not based on the presence/absence of a space between adjacent components or on a size of a space if the space is present.

Figure 1:
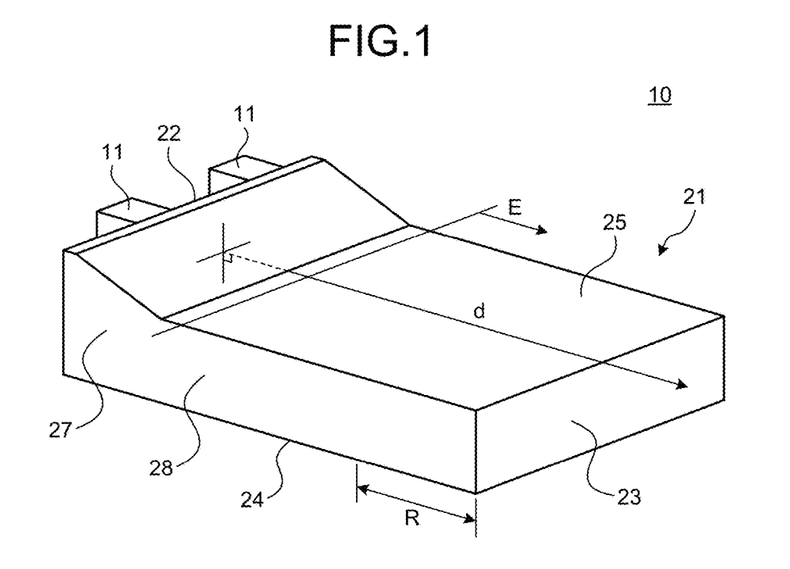
FIG. 1 is a view schematically illustrating the configuration of a planar illumination apparatus in accordance with an embodiment.
Figure 2:
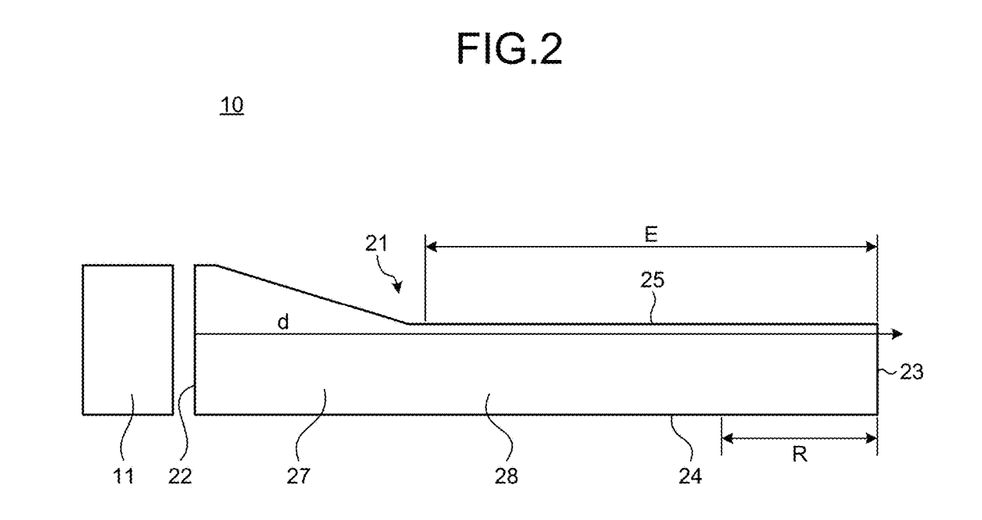
FIG. 2 is a view schematically illustrating the configuration of the planar illumination apparatus in accordance with the embodiment.

FIGS. 1 and 2 are views schematically illustrating the configuration of the planar illumination apparatus 10 in accordance with the embodiment. FIG. 1 is a perspective view illustrating the planar illumination apparatus 10 when viewed from diagonally, and FIG. 2 is a side view illustrating the planar illumination apparatus 10.

A configuration example of the planar illumination apparatus 10 illustrated in FIGS. 1 and 2 is what is called the configuration of a side-light type backlight that includes a light guide plate 21 and a plurality of light sources 11 on a side end surface of the light guide plate 21. The light sources 11 are LEDs (light emitting diodes) emitting, for example, white light, and use what is called side-view LEDs suitable for being disposed on a side end surface of the light guide plate 21. Generally, the LEDs as the light sources 11 are implemented on a flexible printed circuit board (FPC), which is not illustrated. The FPC is disposed in parallel with a main surface, which will be described later, of the light guide plate 21.

Generally distributed and typical LEDs emitting white light use the configuration where blue light emitting diodes emitting blue light are sealed by a transparent resin to which a yellow fluorescent substance exited by blue light and emitting yellow light is added. The generally distributed and typical LEDs emitting white light do not include a flat emission spectrum, and emit pseudo white light having intensity peaks in blue light emitted from the blue light emitting diodes and in yellow light emitted from the yellow fluorescent substance.

Color unevenness in the general planar illumination apparatus 10 depends on an intensity ratio between blue light emitted from the blue light emitting diodes and yellow light emitted from the yellow fluorescent substance, and locally adjusting the intensity ratio between blue light and yellow light can improve color unevenness in the planar illumination apparatus 10.

The method for improving color unevenness in the planar illumination apparatus 10 by locally adjusting the intensity ratio between blue light and yellow light is widely useful in the general planar illumination apparatus 10, but application of the present invention is not limited to this. From the viewpoint of easiness of understanding and usefulness, the embodiment described below is an embodiment for improving color unevenness that depends on the intensity ratio between blue light emitted from the blue light emitting diodes and yellow light emitted from the yellow fluorescent substance, but the application range of the present invention covers the general planar illumination apparatus 10 with certain light sources 11 (for example, the light sources 11 including a variety of light-emitting elements) containing the light sources 11 that include light emitting diodes and a wavelength conversion material (a fluorescent substance, a quantum dot, and the like) excited by light emitted from the light emitting diodes and emitting light (that is not limited to yellow light, for example, green light and red light) of a wavelength longer than a wavelength of blue light, and emit white light. An appropriate modification to the embodiment causes the intensity ratio of light having a predetermined wavelength to be locally adjusted so as to improve color unevenness in the planar illumination apparatus 10.

As illustrated in FIGS. 1 and 2, the light guide plate 21 included in the planar illumination apparatus 10 has approximately a plate shape as a whole, and includes two main surfaces and four end surfaces. The light guide plate 21 is formed of a transparent material, for example, polycarbonate resin.

In order to facilitate the explanation, out of the four end surfaces, an end surface on which the light sources 11 are disposed is referred to as an incident end surface 22, and an end surface opposed to the incident end surface 22 is referred to as a termination surface 23. Out of the two main surfaces, a main surface formed so as to emit light incident from the incident end surface 22 in a plane shape is referred to as an emission surface 25, and a main surface opposed to the emission surface 25 is referred to as a rear surface 24.

The planar illumination apparatus 10 illustrated in FIGS. 1 and 2 includes an incident wedge unit 27 and an emitting unit 28. The incident wedge unit 27 is provided to the incident end surface 22 side on the light guide plate 21, and is formed so that thickness of the light guide plate 21 becomes thinner as the incident wedge unit 27 is separated from the incident end surface 22. The incident wedge unit 27 largely secures the incident end surface 22 such that light from the light sources 11 easily enters, and by contrast, contributes to thinning of the thickness of the light guide plate 21 in the emitting unit 28. In the present invention, the incident wedge unit 27 is not an essential component. However, when the incident wedge unit 27 is formed, the configuration of the incident wedge unit 27 easily causes color unevenness (may be referred to as "incident color unevenness" for convenience) where the vicinity of the incident wedge unit 27 along the incident end surface 22 or an area closer to the incident end surface 22 (area from the incident end surface 22 to the center in a light guiding direction) becomes yellowish. Thus, when the incident wedge unit 27 is provided to the light guide plate 21, a light scattering unit R, which will be described later, according to the present invention is provided to the vicinity of the incident wedge unit 27 or the area closer to the incident end surface 22 on at least one of the emission surface 25 and the rear surface 24 so as to effectively exhibit an action effect of the light scattering unit R.

An effective emission area E is defined on the emission surface 25, out of the main surfaces on the emission surface 25 side, a light shielding means is applied to areas other than a range of the effective emission area E so as to prevent unintended light (stray light) from being leaked. A coordinate of the effective emission area E is defined for a verification experiment, which will be described later. As illustrated in FIGS. 1 and 2, using the incident end surface 22 as a reference, a coordinate d is defined in a direction separated from the incident end surface 22 to the vertical direction. This coordinate d can be considered to substantially correspond to a distance where light incident from the incident end surface 22 is propagated through the light guide plate 21. The distance obtained by this coordinate d may be referred to as a distance d of an incident reference.

A plurality of dots (light path changing means) projecting in a semispherical shape from the light guide plate 21 are disposed on the rear surface 24 of the light guide plate 21. These dots intentionally change a reflected angle of light on the rear surface 24 of the light guide plate 21 so as to adjust a path of light so that light reflected on the rear surface 24 of the light guide plate 21 is emitted from the emission surface 25 of the light guide plate 21. Thus, the displacement of the dots on the rear surface 24 of the light guide plate 21 is an important factor affecting intensity distribution of light emitted from the emission surface 25, and is determined by preliminarily design.

As separated from the incident end surface 22, the quantity of light propagated through the light guide plate 21 becomes smaller. In general, as separated from the incident end surface 22, the arrangement density of the dots on the rear surface 24 of the light guide plate 21 is designed to be higher. A specific example of the dots formed on the rear surface 24 of the light guide plate 21 can be checked by a micrograph of the rear surface 24 of the light guide plate 21, which will be described later.

As illustrated in FIGS. 1 and 2, the light guide plate 21 included in the planar illumination apparatus 10 is provided with the light scattering unit R on the rear surface 24. The light scattering unit R is formed for mainly scattering light emitted from the light emitting diodes than light emitted from a fluorescent substance in the light sources 11.

In the example of the planar illumination apparatus 10 illustrated in FIGS. 1 and 2, the light scattering unit R is provided in a strip shape along the termination surface 23 to an area close to the termination surface 23. This is because color unevenness in the area close to the termination surface 23 (may be referred to as "termination color unevenness" for convenience) is improved in the example of the planar illumination apparatus 10 illustrated in FIGS. 1 and 2. Thus, an arrangement position of the light scattering unit R can be appropriately changed depending on an area where color unevenness to be improved is generated. For example, the light scattering unit R can be provided to not only an area close to the termination surface 23 but also an area close to the incident end surface 22. As described above, color unevenness may be generated in an area close to the incident end surface 22, and this color unevenness can be improved by providing the light scattering unit R to the area close to the incident end surface 22.

In the example of the planar illumination apparatus 10 illustrated in FIGS. 1 and 2, the light scattering unit R is provided to the rear surface 24, but the light scattering unit R may be provided to the emission surface 25, and may be provided to both of the rear surface 24 and the emission surface 25. In other words, the light scattering unit R may be provided to at least one of the emission surface 25 and the rear surface 24 on the light guide plate 21.

As a specific configuration example of the light scattering unit R, it is considered to form fine unevenness smaller than a wavelength of light emitted from the light emitting diodes in the light sources 11 on a surface of the light guide plate 21 corresponding to the light scattering unit R. In the embodiment, the fine unevenness is surface roughness according to the Japanese Industrial Standard (JIS) B0601, and, in particular, the average height is used as a reference of the fine unevenness. The fine unevenness is not necessarily formed on the whole area of the light scattering unit R, and fine unevenness bigger than a wavelength of light emitted from the light emitting diodes may be included in the light scattering unit R.

As described above, when general white LEDs where blue light emitting diodes emitting blue light are sealed with a transparent resin to which the yellow fluorescent substance excited by the blue light and emitting yellow light is added are used as the light sources 11, the fine unevenness formed on the light scattering unit R is formed smaller than a wavelength of blue light emitted from the blue light emitting diodes. For example, a wavelength of blue light is 430 to 490 nm, and unevenness smaller than 430 nm is formed on the surface of the light guide plate 21.

Color unevenness in the planar illumination apparatus 10 is not uniformly generated in the effective emission area E, and may be locally generated and the generation amount is not constant. For example, color unevenness generated in an area close to the termination surface 23 is likely to be gradually increased as separated from the incident end surface 22. Thus, in order to match the generation tendency of the color unevenness, the light scattering unit R preferably includes a transition area where the area density of fine unevenness is gradually increased as separated from the incident end surface 22.

The following describes examples of how to form fine unevenness on the light scattering unit R described above with reference to FIGS. 3 to 5.

Figure 3:
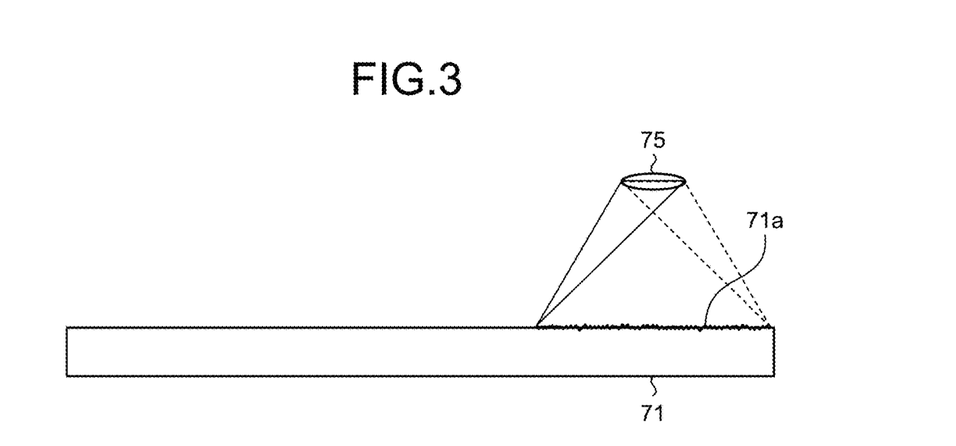
FIG. 3 is a schematic illustrating a state where fine unevenness is formed on a part of a metal mold for injection-molding a light guide plate.

FIG. 3 is a schematic illustrating a state where fine unevenness is formed on a part 71a of a metal mold 71 for injection-molding the light guide plate 21. As illustrated in FIG. 3, in the example of how to form fine unevenness on the light scattering unit R, a laser light irradiation apparatus 75 irradiates the part 71a of the metal mold 71 for injection-molding the light guide plate 21 with laser light for forming the fine unevenness on the light scattering unit R. The part 71a of the metal mold 71 is an area corresponding to the light scattering unit R at the time of injection-molding the light guide plate 21.

The laser light irradiation apparatus 75 illustrated in FIG. 3 is a schematic one, and is not limited to the apparatus configuration of the laser light irradiation apparatus 75 in the process. An apparatus capable of outputting high-intensity laser light that can process the metal mold 71 can be used appropriately as the laser light irradiation apparatus 75.

The intensity of laser light emitted from the laser light irradiation apparatus 75 is dropped close to a processing threshold. Thus, the part 71a of the metal mold 71 irradiated with laser light can process only a shape on a micro surface without changing a macro shape.

Figure 4:
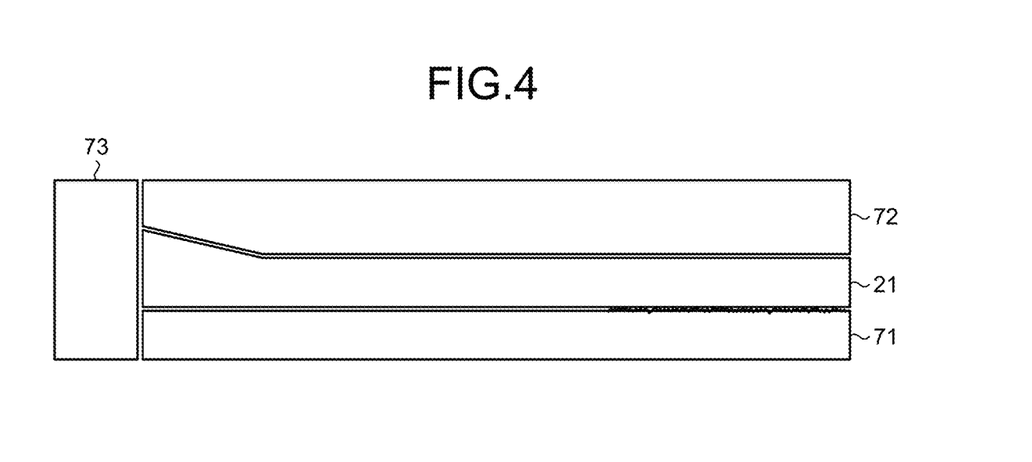
FIG. 4 is a schematic illustrating a state where fine unevenness formed on the metal mold is transferred onto the light guide plate.

FIG. 4 is a schematic illustrating a state where the fine unevenness formed on the metal mold 71 is transferred onto the light guide plate 21. As illustrated in FIG. 4, the metal mold 71 having the fine unevenness on the part 71a and other metal molds 72 and 73 are used for injection-molding the light guide plate 21. Thus, the fine unevenness on the part 71a of the metal mold 71 is transferred onto the light guide plate 21.

If fine unevenness is formed on a surface on the metal mold 71 side where the light guide plate 21 is injection-molded in this manner, the fine unevenness is also formed on the surface of the light guide plate 21 automatically at the time of injection-molding the light guide plate 21, and this processing is suitable for mass production of the light guide plate 21.

Figure 5:
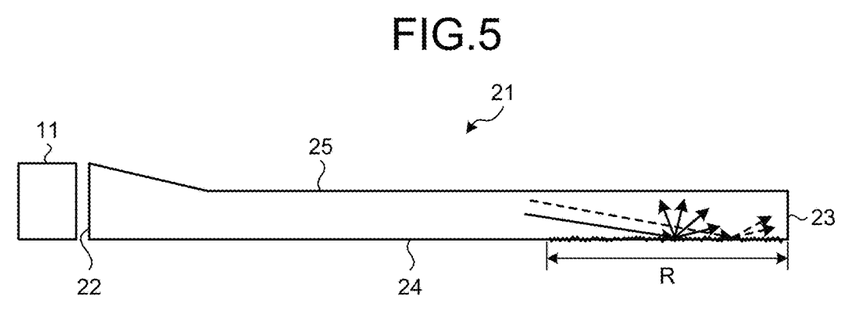
FIG. 5 is a schematic illustrating an action of the light guide plate.

FIG. 5 is a schematic illustrating an action of the light guide plate 21 produced with the above method. As illustrated in FIG. 5, fine unevenness formed on the part 71a of the metal mold 71 is transferred onto the light scattering unit R on the rear surface 24 of the light guide plate 21. The average height of the fine unevenness formed on the light scattering unit R is smaller than a wavelength of light emitted from the light emitting diodes in the light sources 11. Thus, when light, which is incident from the incident end surface 22, emitted from the light emitting diodes and light, which is incident from the incident end surface 22, emitted from the fluorescent substance reach the light scattering unit R, the light emitted from the light emitting diodes (solid arrow in FIG. 5) scatters more intensely than the light emitted from the fluorescent substance (dashed arrow in FIG. 5) because of the effect of Rayleigh scattering. In Rayleigh scattering, it is known that a scattering coefficient is inversely proportional to the fourth power of a wavelength.

Thus, the light emitted from the light emitting diodes passes through the emission surface 25 opposed to the light scattering unit R more easily than the light emitted from the fluorescent substance does. This result means that, when there is deviation where the intensity of the light emitted from the fluorescent substance is stronger than that of the light emitted from the light emitting diodes propagated through the light guide plate 21 close to the light scattering unit R (in other words, when color unevenness is generated), the deviation of the intensity can be improved.

Figure 6:
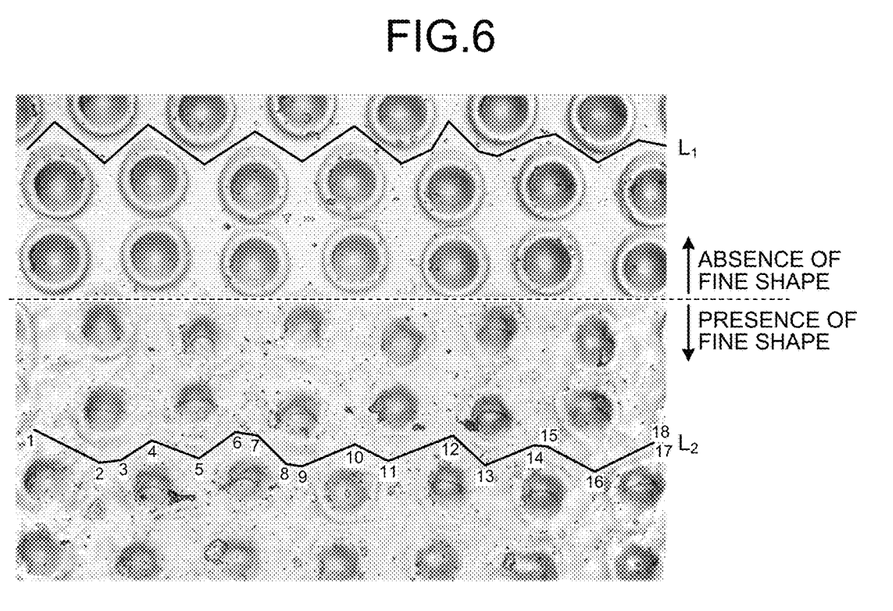
FIG. 6 is a view illustrating an example of an image of fine unevenness formed on a rear surface of the light guide plate that is measured by a laser microscope.
Figure 7:
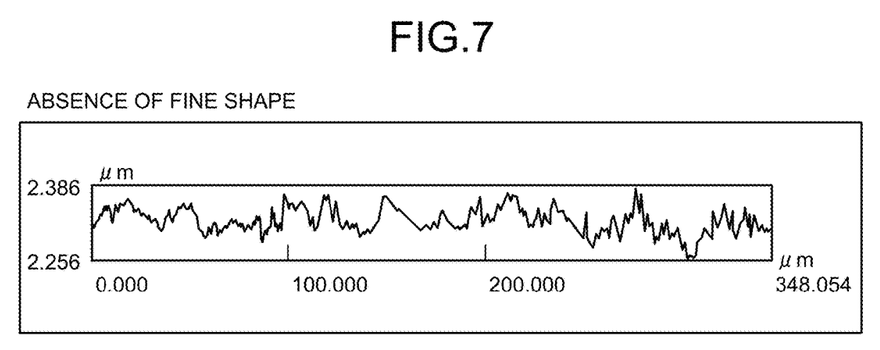
FIG. 7 is a view illustrating a roughness curve measured in an area where fine unevenness is not formed.
Figure 8:
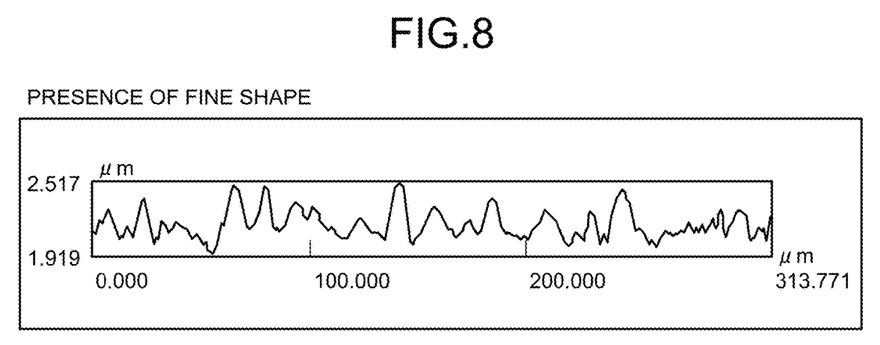
FIG. 8 is a view illustrating a roughness curve measured in an area where fine unevenness is formed.

The following describes specific examples of the fine unevenness formed with the above method with reference to FIGS. 6 to 8. FIG. 6 is a view illustrating an example of an image of fine unevenness formed on the rear surface 24 of the light guide plate 21 that is measured by a laser microscope. The image illustrated in FIG. 6 illustrates an area where fine unevenness is not formed (upper half area illustrating absence of the fine shape in FIG. 6) and an area where fine unevenness is formed (lower half area illustrating presence of the fine shape in FIG. 6).

FIG. 7 is a view illustrating a roughness curve measured in the area where fine unevenness is not formed. The roughness curve corresponds to $L_1$ in FIG. 6. FIG. 8 illustrates a roughness curve measured in an area where fine unevenness is formed, and the roughness curve corresponds to $L_2$ in FIG. 6. The measurement of the roughness curves illustrated in FIGS. 7 and 8 is compliant with the method of the JIS B0601.

As being understood by referring to FIG. 6, in an area where the fine unevenness is formed, the fine unevenness formed in a random shape is substantially provided to the surface of the light guide plate 21. As described above, the dots projecting in a semispherical shape from the light guide plate 21 are disposed on the rear surface 24 of the light guide plate 21. Even when the fine unevenness on the rear surface 24 of the light guide plate 21 overlaps the dots, the overlapping does not affect an action. By contrast, at the time of measuring the surface roughness, the roughness curve (cross-sectional curve) is defined while the position of the dots is avoided so that unevenness resulting from the shape of the dots is mixed. The number in FIG. 6 represents the number of each peak at the time of defining the roughness curve.

As is clear from the comparison between FIGS. 7 and 8, surface roughness is increased on the area where the fine unevenness is formed as compared with the area where the fine unevenness is not formed. To examine a surface property in more details, roughness parameters related to the roughness curves illustrated in FIGS. 7 and 8 are disclosed.

Table 1 described below represents a roughness parameter related to the roughness curve illustrated in FIG. 7, and Table 2 represents a roughness parameter related to the roughness curve illustrated in FIG. 8.

TABLE 1

| Rp | Rv | Rz (Rt) | Rc | Ra | Rq | Rsk | Rku | RΔq |
|---|---|---|---|---|---|---|---|---|
| 0.061 μm | 0.070 μm | 0.131 μm | 0.079 μm | 0.017 μm | 0.021 μm | −0.0982 | 3.1203 | 0.0198 |

TABLE 2

| Rp | Rv | Rz (Rt) | Rc | Ra | Rq | Rsk | Rku | RΔq |
|---|---|---|---|---|---|---|---|---|
| 0.342 μm | 0.255 μm | 0.598 μm | 0.343 μm | 0.091 μm | 0.115 μm | 0.8221 | 3.2874 | 0.0538 |

The meaning of each parameter illustrated in Tables 1 and 2 is as follows. Details of a calculation method and the like are described in the JIS B0601. Rp represents the maximum peak height and the maximum value of peak height in the roughness curve, and Rv represents the maximum root depth and the maximum value of root depth in the roughness curve. Rz represents the maximum height and the sum of the maximum value of peak height and the maximum value of root depth in the roughness curve. In other words, among the maximum peak height, the maximum root depth, and the maximum height, the relation of Rz=Rp+Rv is established. Rt represents the maximum cross-sectional height, and coincides with the maximum height because reference length and evaluation length are not distinguished in the measurement.

As for the rest, Rc represents the average height and an average value of height of a contour curve factor. Ra represents the arithmetic average roughness, Rq represents the root average square roughness, Rsk represents the skewness, Rku represents the kurtosis, and RΔq represents the root average square gradient. The specific definition thereof is omitted.

As is clear from the comparison between Tables 1 and 2, a parameter related to the surface roughness is increased on the area where the fine unevenness is formed as compared with the area where the fine unevenness is not formed, and measured values can also illustrate that the surface roughness is increased on the area where the fine unevenness is formed as compared with the area where the fine unevenness is not formed.

In particular, as described in Table 2, average height of the roughness curve in the area where the fine unevenness is formed is 0.343 μm, and this greatness is smaller than a wavelength of blue light (for example, 430 to 490 nm). Thus, blue light than yellow light is strongly scattered on the fine unevenness formed on the surface of the light guide plate 21 illustrated in FIG. 6.

Figure 9:
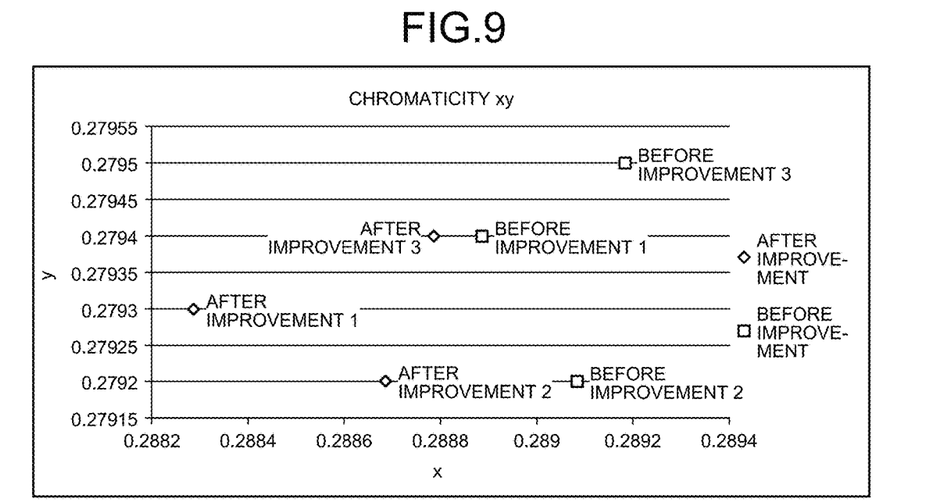
FIG. 9 is a view illustrating a chromaticity diagram that represents difference in chromaticity depending on the presence/absence of application of the present invention.
Figure 10:
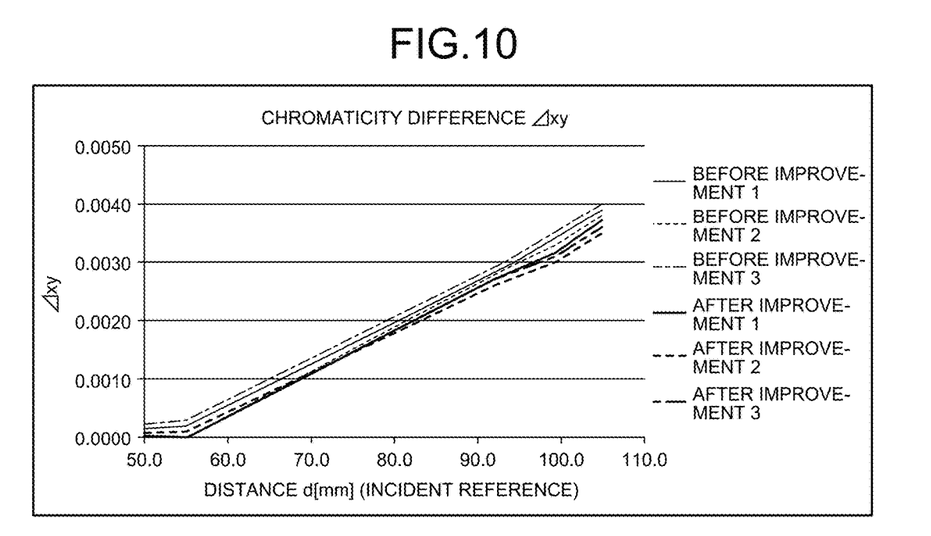
FIG. 10 is a view illustrating a graph that represents difference in chromaticity difference depending on the presence/absence of application of the present invention.

The following describes verification results of effects on color unevenness improvement of the fine unevenness described above with reference to FIGS. 9 and 10. FIG. 9 is a view illustrating a chromaticity diagram that represents difference in chromaticity depending on the presence/absence of application of the present invention, and FIG. 10 is a view illustrating a graph that represents difference in chromaticity difference depending on the presence/absence of application of the present invention.

The chromaticity illustrated in FIG. 9 represents chromaticity in the CIE colorimetric system. In other words, the chromaticity represents a color mixture ratio calculated by tristimulus values of light X, Y, and Z illustrated on the XY plane. FIG. 9 represents only an area in white to which the planar illumination apparatus 10 used for the experiment belongs that is extracted from a diagram generally referred to as the xy chromaticity diagram. Thus, the chromaticity diagram illustrated in FIG. 9 illustrates bluish white toward the lower left and yellowish white toward the upper right.

The chromaticity diagram illustrated in FIG. 9 illustrates examples of chromaticity of the planar illumination apparatus 10 that is improved with application of the present invention (after improvement 1 to 3), and examples of chromaticity of the planar illumination apparatus that is not improved without application of the present invention (before improvement 1 to 3). The planar illumination apparatus 10 that is improved with application of the present invention is the planar illumination apparatus 10 having the configuration described above, and, in particular, the planar illumination apparatus 10 used for the experiment is provided with the light scattering unit R on an area at 20 mm from the termination surface 23 on the rear surface 24 of the light guide plate 21. By contrast, the planar illumination apparatus that is not improved without application of the present invention is the planar illumination apparatus 10 that is not provided with the light scattering unit R.

A value of chromaticity in each example illustrated in FIG. 9 is chromaticity at the termination part of the effective emission area E, in other words, at a position closest to the termination surface 23 in the effective emission area E.

As being understood by comparing the chromaticity of after improvement 1 to 3 with the chromaticity of before improvement 1 to 3 illustrated in FIG. 9, the position for the chromaticity of after improvement 1 to 3 is changed to the lower left in the chromaticity diagram than the position for the chromaticity of before improvement 1 to 3. This comparison demonstrates that light at the termination part of the effective emission area E is more bluish white in the planar illumination apparatus 10 that is improved with application of the present invention than the planar illumination apparatus that is not improved without application of the present invention. In other words, this comparison demonstrates that application of the present invention enables color unevenness where light at the termination part of the effective emission area E becomes yellowish to be improved.

The chromaticity difference illustrated in FIG. 10 is defined as follows. When a coordinate of chromaticity at a reference point on the xy chromaticity diagram is defined as (x0, y0), and a coordinate of chromaticity at each measurement point on the xy chromaticity diagram is defined as (x, y), the chromaticity difference Δxy for each measurement point is defined using the following expression.

$$\Delta xy = ((x0-X)^2 + (y0-y)^2)^{1/2}$$

The chromaticity difference Δxy measures color unevenness from the viewpoint of difference in color tone in the comparison with a reference point.

The graph illustrated in FIG. 10 displays a distance d in a direction separated from the incident end surface 22 to a vertical direction (distance of an incident reference) on a lateral axis, and the chromaticity difference Δxy at the corresponding position on a longitudinal axis. A range of the lateral axis is illustrated from a distance of 50 mm to a position of 105 mm in order to focus on color unevenness at the termination part.

The graph illustrated in FIG. 10 illustrates examples of the chromaticity difference Δxy of the planar illumination apparatus that is improved with application of the present invention (after improvement 1 to 3), and examples of the chromaticity difference Δxy of the planar illumination apparatus that is not improved without application of the present invention (before improvement 1 to 3). The configuration of the planar illumination apparatus for after improvement 1 to 3 and before improvement 1 to 3 is the same as that in the verification experiment illustrated in FIG. 9.

As being understood by comparing the chromaticity difference Δxy of after improvement 1 to 3 with the chromaticity difference Δxy of before improvement 1 to 3 illustrated in FIG. 10, the chromaticity difference Δxy of after improvement 1 to 3 has the lower value as a whole than the chromaticity difference Δxy of before improvement 1 to 3 does. This comparison demonstrates that color unevenness is more improved in the planar illumination apparatus 10 that is improved with application of the present invention than the planar illumination apparatus that is not improved without application of the present invention from the viewpoint of difference in color tone in the comparison with a reference point.

The embodiment of the present invention is specifically described as above, but the present invention is not limited to the embodiment, and various changes and modifications based on a technical concept of the present invention can be made.

For example, in the embodiment, the light scattering unit R includes a transition area where the area density of fine unevenness is gradually increased as separated from the incident end surface 22 ("first transition area" for convenience) as necessary. By contrast, when the light scattering unit R is provided to the vicinity of the incident wedge unit 27 or an area closer to the incident end surface 22 in order to reduce incident color unevenness, the light scattering unit R may include a transition area where the area density of fine unevenness is gradually decreased as separated from the incident end surface 22 ("second transition area" for convenience) as necessary. Regardless of a distance of the incident reference, the light scattering unit R may include an area where the area density of fine unevenness is increased or decreased ("third transition area" for convenience) with respect to a direction parallel with the incident end surface 22. In the embodiment, the light scattering unit R is provided in a strip shape along the incident end surface 22, but, for example, the outer edge of the light scattering unit R may be undulated or may be curved.

When it is assumed that a gate is provided along the end surface orthogonal to the incident end surface at the time of molding the light guide plate with an injection-molding method, color unevenness may be generated uniformly or non-uniformly depending on a distance from the end surface orthogonal to the incident end surface 22 (with respect to a direction parallel with the incident end surface 22). Even when color unevenness in this form is generated alone or is generated in a mixed state with color unevenness in other forms (for example, incident color unevenness and termination color unevenness), the light scattering unit R according to the present invention can be appropriately provided (for example, by combining the first transition area with the third transition area as appropriate) depending on an area where color unevenness is generated and an generation amount so as to implement the uniformity of a color tone at a high level.

For example, numerical values described in the embodiment are only examples, and different numerical values may be used as necessary. An apparatus formed by combining each of the above components as appropriate is also included in the present invention. Further effects or modifications can be easily derived by the skilled person.

What is claimed is:

1. A planar illumination apparatus comprising:
a light source that includes a light emitting diode and a wavelength conversion material excited by light emitted from the light emitting diode so as to emit light, and emits white light; and
a light guide plate that includes an incident end surface on which the light source is disposed, and an emission surface that emits light incident from the incident end surface, wherein
the light guide plate is provided with a light scattering unit that includes a fine unevenness portion locally formed on at least one of the emission surface and a rear surface opposed to the emission surface, the fine unevenness portion mainly scattering, by Rayleigh scattering, light emitted from the light emitting diode rather than light emitted from the wavelength conversion material.

2. The planar illumination apparatus according to claim 1, wherein the light scattering unit is provided to an area close to a termination surface opposed to the incident end surface.

3. The planar illumination apparatus according to claim 1, wherein the light scattering unit includes a transition area where area density of the fine unevenness portion is gradually increased as separated from the incident end surface.

4. The planar illumination apparatus according to claim 1, wherein the light emitting diode is a blue light emitting diode that emits blue light, and the wavelength conversion material is a fluorescent substance that is excited by the blue light and emits light of a wavelength longer than that of the blue light.

5. The planar illumination apparatus according to claim 1, wherein
the light scattering unit is integrally formed with the light guide plate, and
a material of the light scattering unit is a same as that of the light guide plate.

6. The planar illumination apparatus according to claim 1, wherein the light scattering unit is provided in a position that is according to an area on the light guide plate in which color unevenness is generated.

7. The planar illumination apparatus according to claim 1, wherein
the light scattering unit is provided on the rear surface of the light guide plate, and is provided in an area close to a termination surface of the light guide plate opposed to the incident end surface so as to adjust an intensity ratio between the light emitted from the wavelength conversion material and the light emitted from the light emitting diode that are included in the white light to be emitted from the emission surface.

8. The planar illumination apparatus according to claim 1, wherein
 the white light includes first light emitted from the light emitting diode and second light emitted from the wavelength conversion material,
 the white light is made incident on the incident end surface from the light source, and the emission surface emits the white light incident from the incident end surface through the light guide plate, and
 the fine unevenness portion mainly scatters the first light rather than the second light.

9. A planar illumination apparatus, comprising:
 a light source that includes a light emitting diode and a wavelength conversion material excited by light emitted from the light emitting diode so as to emit light, and emits white light and
 a light guide plate that includes an incident end surface on which the light source is disposed, and an emission surface that emits light incident from the incident end surface, wherein
 the light guide plate is provided with a light scattering unit on at least one of the emission surface and a rear surface opposed to the emission surface, the light scattering unit mainly scattering light emitted from the light emitting diode than light emitted from the wavelength conversion material,
 the light scattering unit includes fine unevenness that mainly scatters light emitted from the light emitting diode than light emitted from the wavelength conversion material by Rayleigh scattering, and
 the light scattering unit includes an area where area density of the fine unevenness is increased or decreased along the incident end surface.

10. The planar illumination apparatus according to claim 1, wherein the light scattering unit includes the fine unevenness portion that is smaller than a wavelength of light emitted from the light emitting diode.

11. The planar illumination apparatus according to claim 10, wherein the fine unevenness portion has an average height that is smaller than a wavelength of light emitted from the light emitting diode.

12. A planar illumination apparatus comprising:
 a light source that includes a light emitting diode and a wavelength conversion material excited by light emitted from the light emitting diode so as to emit light, and emits white light; and
 a light guide plate that includes an incident end surface on which the light source is disposed, and an emission surface that emits light incident from the incident end surface, wherein
 the light guide plate is provided with a light scattering unit on at least one of the emission surface and a rear surface opposed to the emission surface, the light scattering unit mainly scattering light emitted from the light emitting diode rather than light emitted from the wavelength conversion material, and
 the light scattering unit is provided in a position that is according to an area on the light guide plate in which color unevenness is generated.

13. The planar illumination apparatus according to claim 12, wherein
 the white light includes first light emitted from the light emitting diode and second light emitted from the wavelength conversion material,
 the white light is made incident on the incident end surface from the light source, and the emission surface emits the white light incident from the incident end surface through the light guide plate, and
 the light scattering unit mainly scatters the first light rather than the second light.

* * * * *